(12) United States Patent
Asuri

(10) Patent No.: US 8,817,336 B2
(45) Date of Patent: Aug. 26, 2014

(54) SCANNING DEVICE AND METHOD WITH PHANTOM FOLDER

(75) Inventor: Hari Sri Asuri, Irvine, CA (US)

(73) Assignee: PFU Limited, Kahoku-shi (JP)

( * ) Notice: Subject to any disclaimer, the term of this patent is extended or adjusted under 35 U.S.C. 154(b) by 0 days.

(21) Appl. No.: 13/568,438

(22) Filed: Aug. 7, 2012

(65) Prior Publication Data

US 2013/0038911 A1 Feb. 14, 2013

Related U.S. Application Data

(60) Provisional application No. 61/521,258, filed on Aug. 8, 2011.

(51) Int. Cl.
*H04N 1/04* (2006.01)

(52) U.S. Cl.
USPC .......................... 358/474; 358/448; 358/488

(58) Field of Classification Search
USPC .............. 358/474, 1.15, 1.14, 448, 446, 524, 358/488, 473, 471
See application file for complete search history.

(56) References Cited

U.S. PATENT DOCUMENTS

| 7,139,428 | B2 * | 11/2006 | Kobayashi et al. | 382/180 |
| 7,869,075 | B2 * | 1/2011 | Matsui | 358/1.15 |
| 8,089,647 | B2 * | 1/2012 | Hotta et al. | 358/1.15 |
| 8,115,969 | B2 * | 2/2012 | Borrey et al. | 358/448 |
| 8,405,858 | B2 * | 3/2013 | Yoshida | 358/1.15 |
| 2002/0067224 | A1 | 6/2002 | Wen | |
| 2009/0089353 | A1 * | 4/2009 | Fukuta et al. | 709/201 |
| 2009/0323128 | A1 | 12/2009 | Asuri et al. | |

OTHER PUBLICATIONS

Office action issued on Jun. 25, 2014 in corresponding Japanese Application No. 201210279226.0, 6pp.

* cited by examiner

*Primary Examiner* — Negussie Worku
(74) *Attorney, Agent, or Firm* — Christie, Parker & Hale, LLP.

(57) ABSTRACT

An object of the present invention is to provide a scanning device, a scanning method, and a computer-readable medium capable of easily performing display of a scanner on a computer of a user and display for starting scanning operation. A scanning device include a controller for displaying a phantom folder corresponding to a usable scanner on a display unit only when the scanner can be used, and for starting scanning operation by the scanner when the phantom folder is selected, a receiver receiving scan data from the scanner, and a storage storing the scan data received.

8 Claims, 18 Drawing Sheets

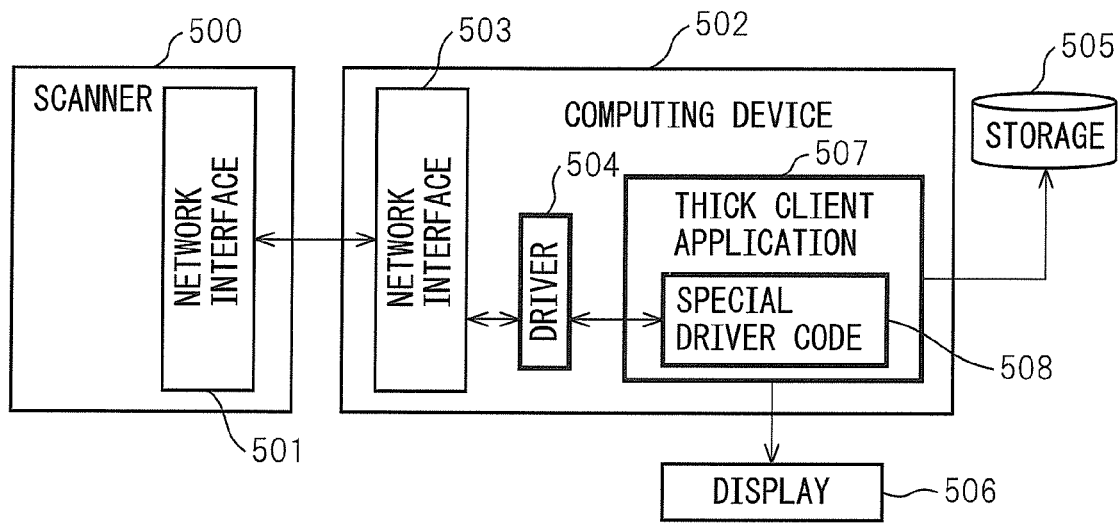
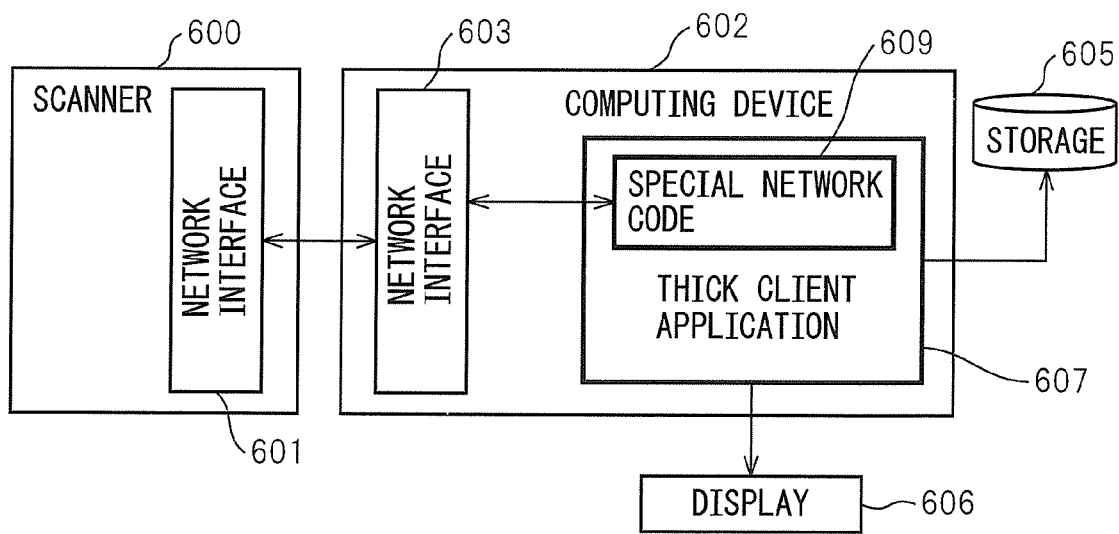

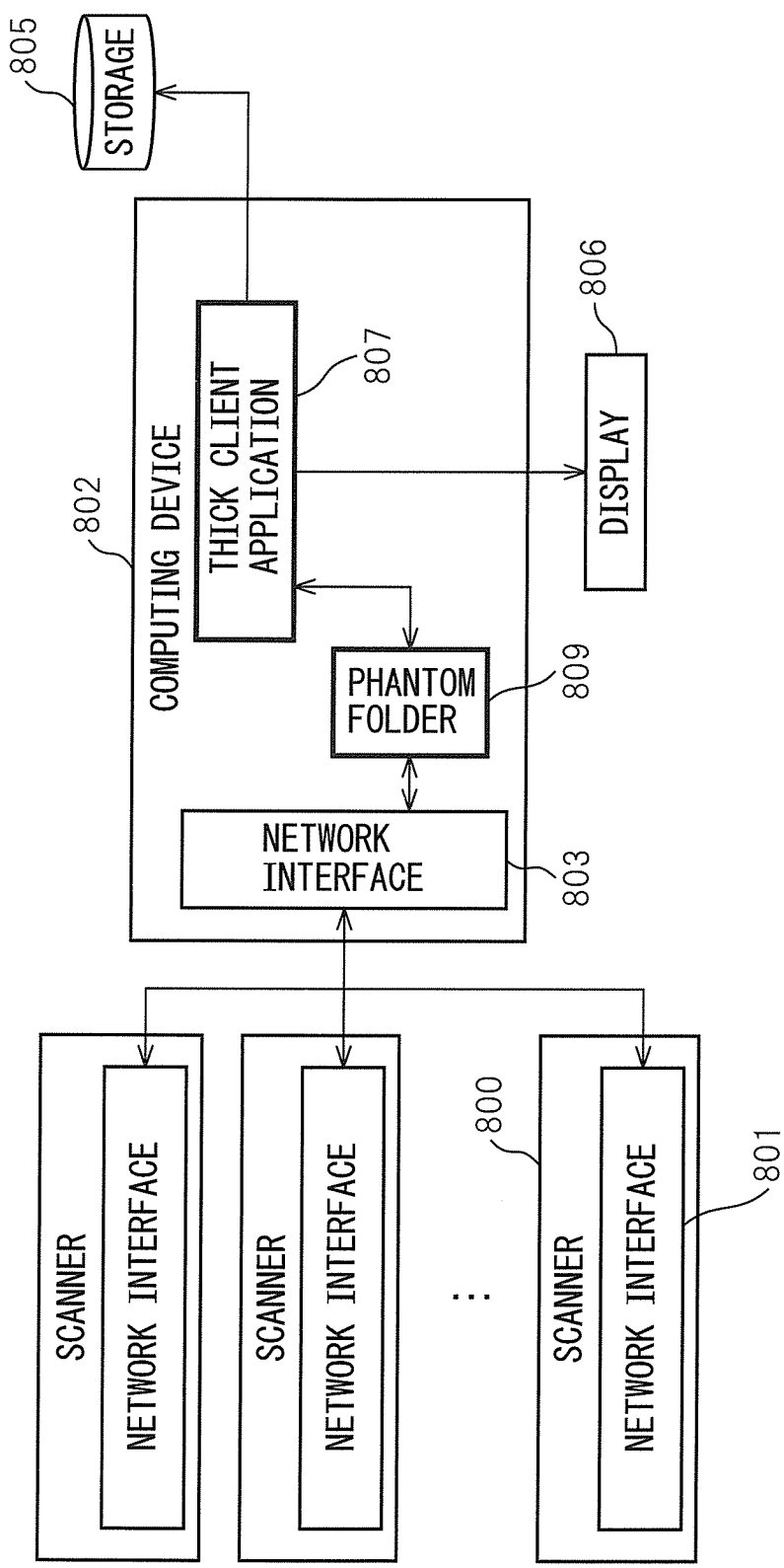

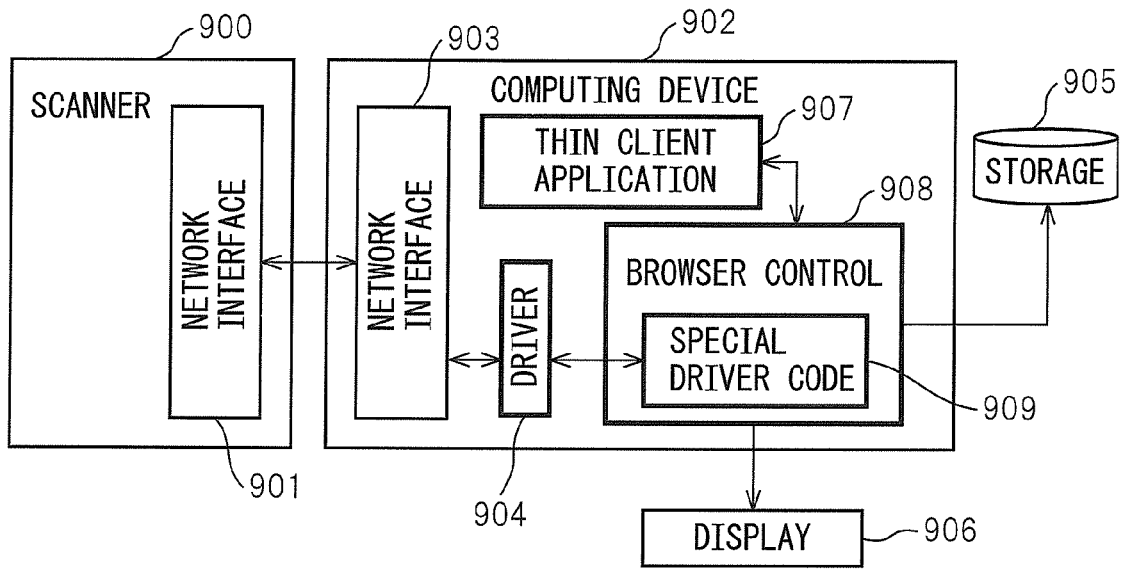
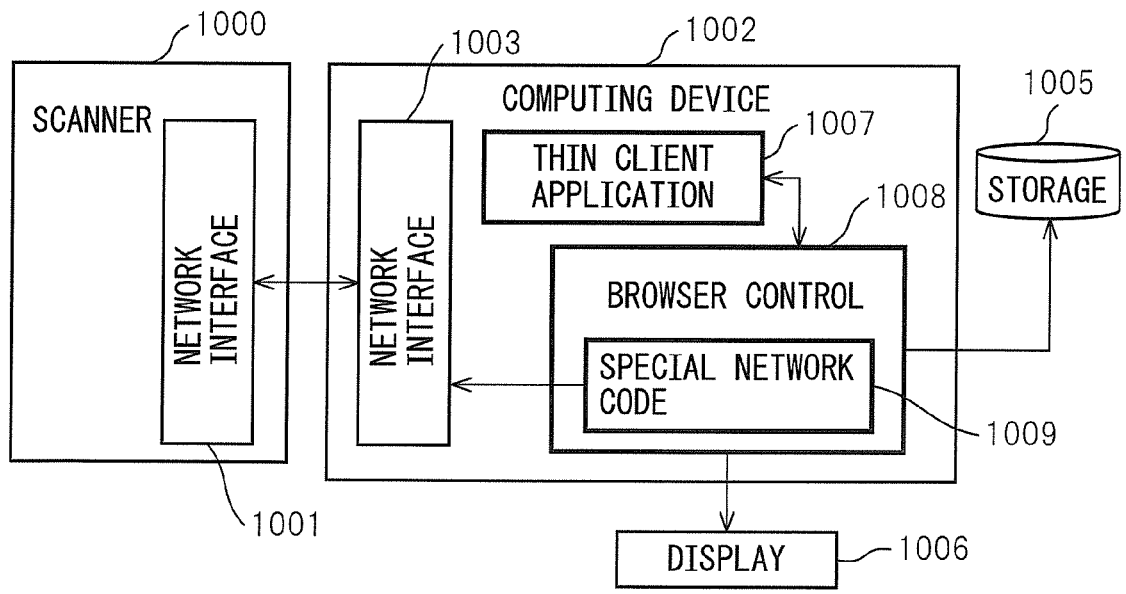

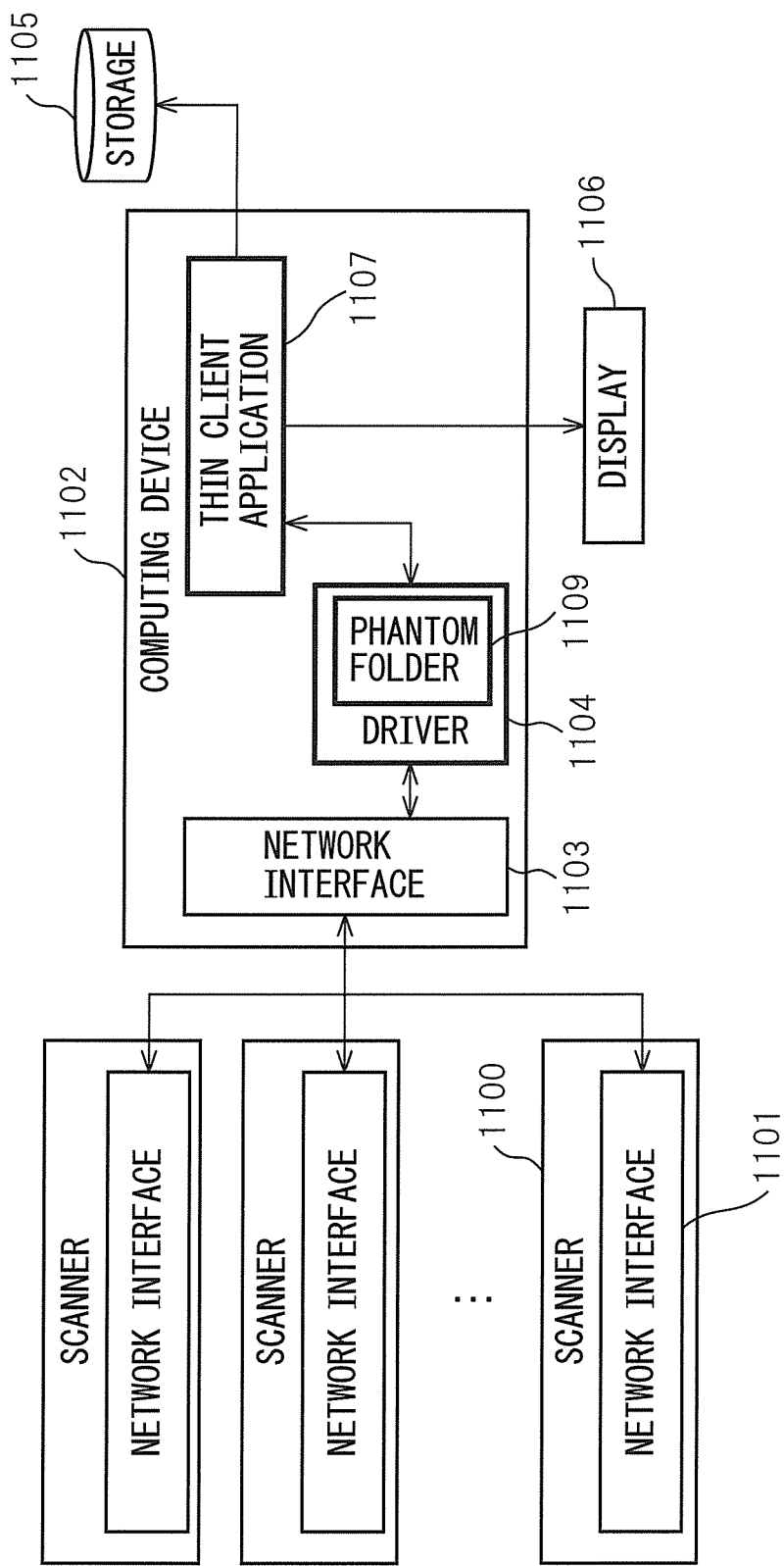

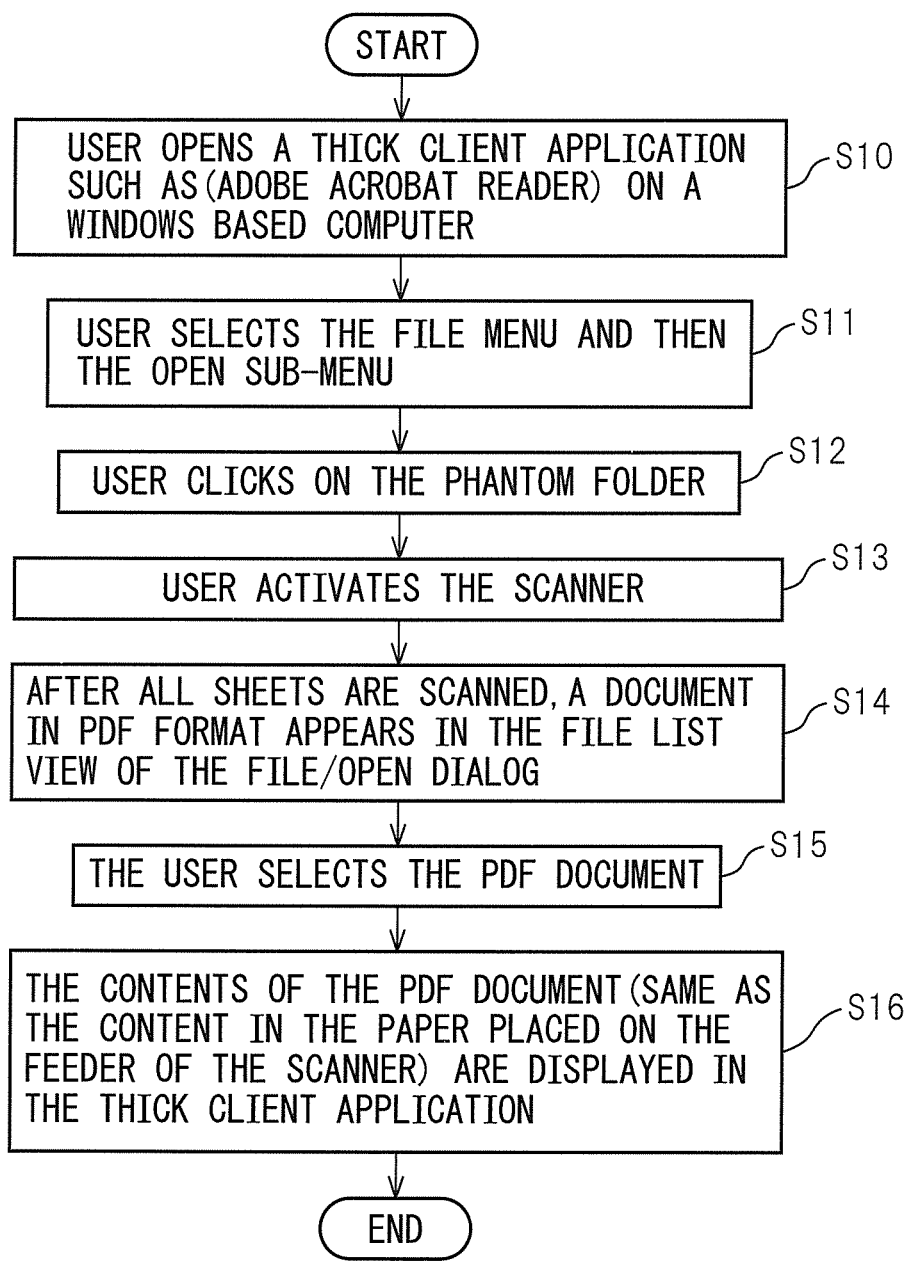

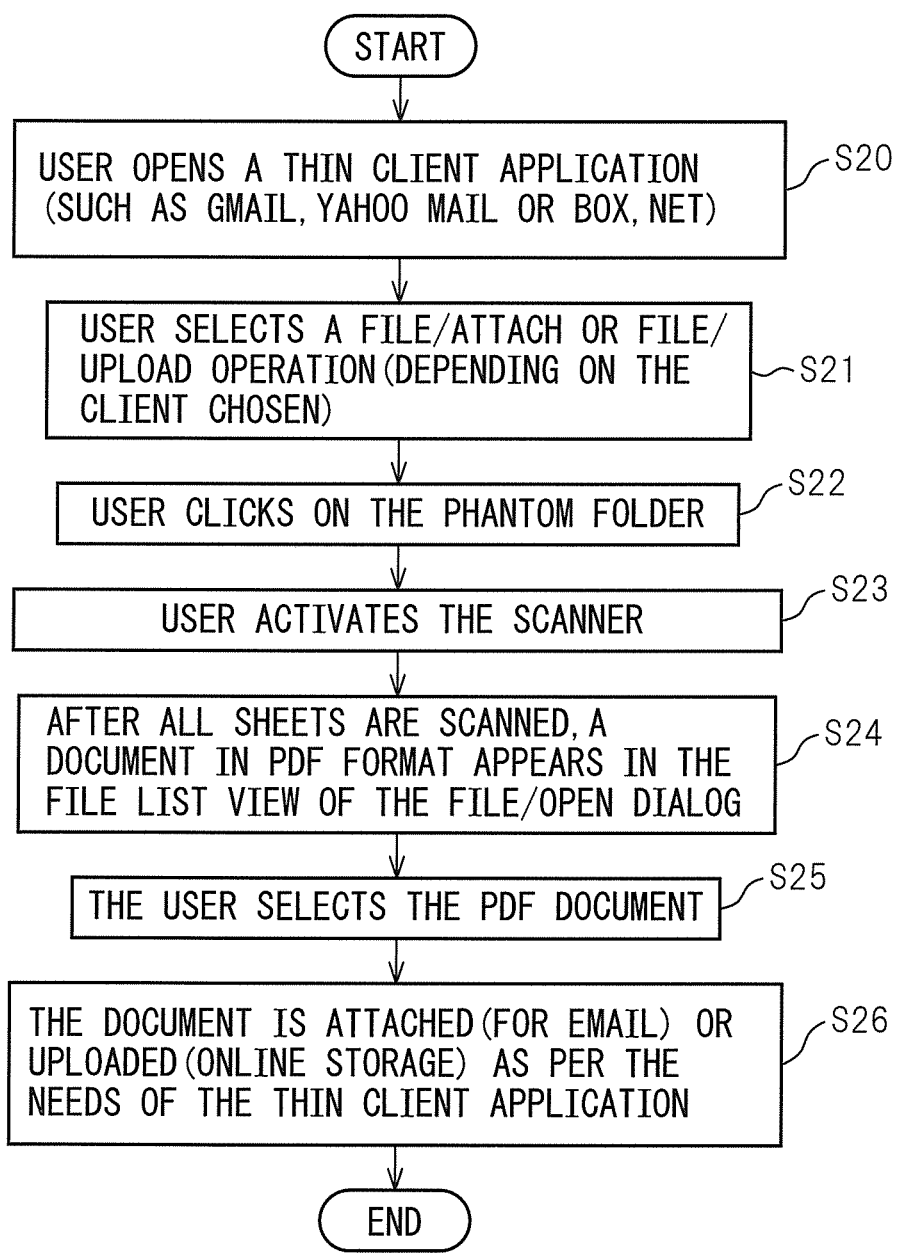

SCANNING DEVICE AND METHOD WITH PHANTOM FOLDER

RELATED APPLICATIONS

This application is a non-provisional U.S. patent application based upon and claiming the benefit of a provisional U.S. patent application No. 61/521,258, filed on Aug. 8, 2011, the entire contents of which are incorporated herein by reference.

TECHNICAL FIELD

The present invention relates to a scanning device, a scanning method, and a computer-readable medium, more specifically, to a scanning device, a scanning method, and a computer-readable medium using a phantom folder.

BACKGROUND

Scanning of paper documents to convert them to electronic data has become a necessity due to government, legal and business requirements around the world. Further, unlike a decade ago when scanning of business documents was carried out in a special facility using large scanning devices, today, most scanning is carried out by office personnel and home users using small, portable scanning devices. In addition, there is a need to use electronic versions of paper documents within computer applications that users use on a daily basis, including but not limited to document viewing, word processing, electronic publishing, internet browser-based, and the like. Many such applications do not have the ability to communicate with a scanner. In order to incorporate electronic versions of documents into such applications, users must (a) purchase/obtain a scanning application; (b) learn how to use the scanning application, (c) figure out how to make the application communicate with the scanner, (d) scan to a location on the user's computer and in the right format for the target application to use the document, and (e) import the document from the user's computer into the target application.

While (a) is typically resolved by using the scanning application that comes with a scanner, (b) and (c) tend to be difficult tasks, especially for a home user or a small office user where the user is trained to use his line of business applications.

Most users are familiar with downloading images from a digital camera onto their computer. A similar approach that is simple for anyone to understand is needed for scanning documents into a user's computer or application. Prior methods such, as display of a digital camera as a virtual drive or an external storage device such as a hard drive or a thumb drive as a virtual drive, are limited to devices that contain previously captured and saved electronic documents only. The method outlined in this document represents a scanner to the user on their computer in a way that is much similar to the way a digital camera represents itself to the user but with the added ability to create electronic documents on demand.

There is a known scanning method in which when a user selects a virtual file containing a specific set of rules defining how a document should be scanned on a display of a personal computer, an application linked to the virtual file operates (refer to Patent Publication 1). In that method, when the virtual file is selected, availability of a scanner connected to a personal computer is determined, and scanning using the scanner is started. Scan data from the scanner is processed according to the rules associated with the selected virtual file, and the processed data is output. The virtual file is essentially a background scanning application with a predefined set of scanning parameters. However, it does not represent the scanner itself. Therefore, even if the virtual file is displayed to the user, it is unclear if the scanner is usable or not. For example, if the scanner's communication mechanism is not compatible with that of the virtual file, or if no scanner is connected, that mechanism will fail.

Patent Document 1: U.S. Patent Application Publication No. 2009/0323128

SUMMARY

Many software applications have been designed to communicate with a scanner through the scanner's driver. However, these applications are written to communicate using a specific set of protocols and designed to communicate with certain scanners only. There is consequently an inconvenience when as a new scanner is put on the market or if the protocol of an existing scanner driver changes, an existing application has to be updated so as to be able to communicate with the new scanner or the updated driver.

Web browser applications can communicate with scanners through special mechanisms, called 'browser controls' in this document. It is difficult to generate a universal browser control. There is consequently an inconvenience that as a new scanner is put on the market or the protocol of a scanner driver changes, a new browser control which can communicate with the new scanner has to be generated.

In the case of using virtual files, after a virtual file is selected, determination of whether a scanner is usable or not starts. There is consequently an inconvenience such that, even when a virtual file is selected, if a usable scanner does not exist or if the scanner is incompatible with the design of the virtual file, the user has to set up the scanner again. That is, the virtual file represents an application program that processes scan data into a specific document type associated with the virtual file but does not represent a scanner apparatus.

An object of the present invention is to provide a scanning device, a scanning method, and a computer-readable medium capable of solving the inconveniences.

Another object of the present invention is to provide a scanning device, a scanning method, and a computer-readable medium capable of easily displaying of a scanner on a computer of a user and starting a scanning operation.

Another object of the invention is to provide a scanning device, a scanning method, and a computer-readable medium in which a software application (whether it is an application running on a computing device or within a browser) can use a scanned or processed document without having to change the application.

A scanning device includes a controller for displaying a phantom folder corresponding to a usable scanner on a display unit only when the scanner can be used, and for starting of scanning by the scanner when the phantom folder is selected, a receiver receiving scan data from the scanner, and a storage storing the scan data received.

Preferably, in the scanning device, the controller displays the phantom folder on the display unit by using an open command of an application.

Preferably, in the scanning device, the controller starts a scanning operation by a scanner by transmitting a scan start signal conforming to a standard API which supports scanners, to the scanner.

Preferably, in the scanning device, the controller converts the scan data into a document type which is set by the user and stores the resultant data in the storage.

Preferably, in the scanning device, the controller displays the scan data in the phantom folder.

A scanning method includes the steps of displaying a phantom folder corresponding to a usable scanner on a display unit only when the scanner is usable, starting scanning operation by the scanner when the phantom folder is selected, receiving scan data from the scanner, and storing the scan data received into a storage.

A computer readable non-transitory medium storing a program causing a processor to execute a process, the process including displaying a phantom folder corresponding to a usable scanner on a display unit only when the scanner is usable, starting scanning operation by the scanner when the phantom folder is selected, receiving scan data from the scanner, and storing the scan data received into a storage.

According to the scanning device, the scanning method, and the computer-readable medium, display of a scanner on a computer of a user and display for starting scanning operation can be easily performed by using a phantom folder.

According to the scanning device, the scanning method, and the computer-readable medium, a software application can use a scanned or processed document by using a phantom folder without having to change the application.

BRIEF DESCRIPTION OF THE DRAWINGS

These and other features and advantages of the present invention will be better understood by reading the following description of embodiments, taken together with the drawings wherein:

FIG. 5 is a schematic block diagram (1) of a thick client system using a network;

FIG. 6 is a schematic block diagram (2) of a thick client system using a network;

FIG. 8 is a schematic block diagram (2) of a thick client system on a network using a phantom folder;

FIG. 9 is a schematic block diagram (1) of a thin client system using a network;

FIG. 10 is a schematic block diagram (2) of a thin client system using a network;

FIG. 11 is a schematic block diagram (1) of a thin client system on a network using phantom folders;

FIG. 21 is a diagram showing an example of the process flow in the case of using the thick client application and the phantom folder; and FIG. 22 is a diagram showing an example of the process flow of the case of using the thin client application and the phantom folder.

DESCRIPTION OF EMBODIMENTS

Figure 1:
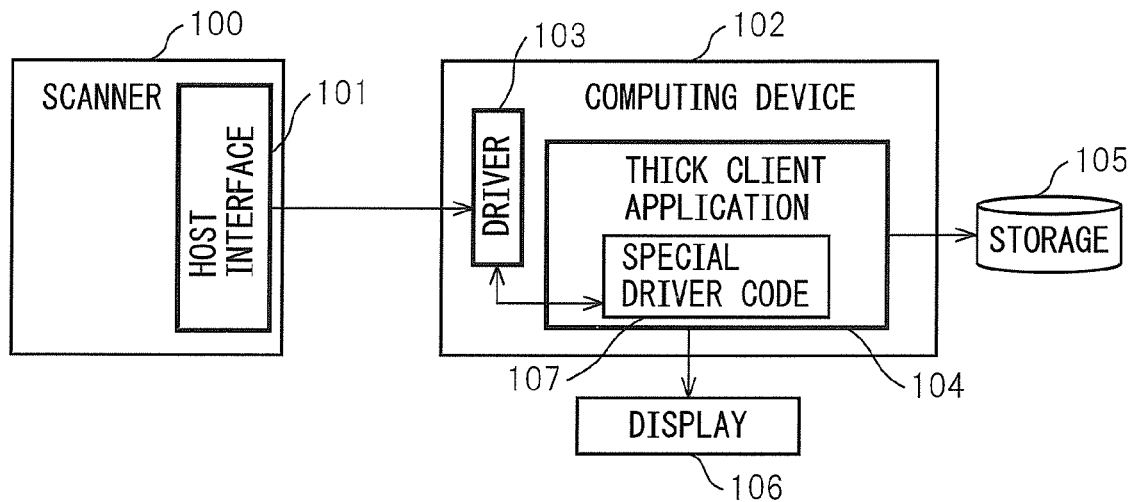
FIG. 1 is a schematic block diagram of a thick client system.

Hereinafter, with reference to the drawings, a scanning device, a scanning method, and a computer-readable medium according to the present invention will be described. It is however to be understood that the invention is not limited to the drawings and embodiments which will now be described.

The scanning device, the scanning method, and the computer-readable medium utilizes a phantom folder for documents. The phantom folder represents the scanner and also represents a phantom source for electronic documents. The electronic documents are created on demand when the phantom folder is selected (using the scanner to create the actual electronic documents). Enabled by software (computer) module (refer to FIG. 20; henceforth, the term 'software module' refers to the software that enables the display and use of the phantom folder), the phantom folder is displayed to the user as a file folder on the computer. Further, when the user opens the phantom folder, a scanning operation is initiated either manually (by the user) or automatically by the software module. Scanning parameters for such scanning may be predefined by the user or provided through a user interface displayed by the software module. The scanning operation converts any paper documents into electronic form and returns those to the software module. The software module displays these electronic documents as contents of the phantom folder on the user's computer. The user is then able to perform any file based operations on the electronic documents.

The scanning device, the scanning method, and the computer-readable medium enables access to a scanner and a scanned document from within any software application (called the target application henceforth) that can open, and view or process an electronic document. In some embodiments, the scanning device, the scanning method, and the computer-readable medium includes a computer program module (software)—software module—installed on the user's computing machine that represents the scanning device similar to a document folder on the computer. In some embodiments, the scanning device, the scanning method, and the computer-readable medium utilizes the conventional methods already available to open a document from the target application. Typically, this involves but not limited to the opening of a file within a folder on the user's computer. The scanner, when connected, is represented as a phantom folder within the user's computer.

Next, when the user chooses the phantom scanner folder, a scanning operation is initiated automatically by the software module, or manually (by the user) depending on the user's choice. Scanning parameters (such as resolution, color mode, etc.) are predefined by the user or specified before scanning commences. This is very similar to how a user operates a scanner normally. The scanning operation results in the conversion of the paper document into one or more electronic documents returned to the module. The software module may then perform various operations on the electronic documents (including but not limited to image enhancements, optical character recognition, and format conversion). After processing the documents, the software module stores them in a hidden location on the user's computing machine. At the same time, the software module displays the scanned documents under the phantom folder for the user to see. The user then selects and imports those documents into the target application for further processing.

The scanning device, the scanning method, and the computer-readable medium treats a scanner as a phantom storage object where electronic documents are created on demand, thereby eliminating the additional steps of creating electronic documents first before importation into the target application.

In some embodiments, a user computer is coupled (wired or wirelessly) to a document scanning device. In addition, the computer has a computer software module (software) installed that represents the scanning device similar to a document folder on the computer. The document folder is 'phantom' in the sense that it is not a real folder and does not hold any documents permanently but represents a folder-like object that displays electronic documents that are created on demand. When the user 'opens' the 'phantom folder,' the software module interacts with the actual device's scan driver to set the device up for scanning any documents placed on the scanner. The word "document," as used herein refers to documents including text, graphics and/or pictures. Further, the module initiates a scan automatically, or waits for the user to activate scanning.

While waiting for the activation by the user, the module may solicit user input on configuring the typical scanning parameters such as, resolution, paper size, color mode, and the like. However, the scanning parameters are based on the capabilities of the connected scanner and are not predetermined. When scanning is initiated, the scanner scans the documents, converts them to electronic form using the parameters specified, and returns the electronic documents to the software module through the scanner driver. Then, the software module processes these documents as per user specifications and places these electronic documents at a predetermined location on the computer and also displays them within the phantom folder hence, giving the user the impression that the folder actually contains documents. The processing performed by the software module includes but not limited to image enhancements, optical character recognition and format conversion. The user can then process these electronic documents at that phantom folder like they would any normal documents of the same type (including copying, moving, deleting, dragging/dropping, viewing, printing, renaming, etc.).

In some embodiments, a handheld device such as, a tablet computer or a smart phone may be used to connect (wired or wirelessly) to the external scanner using a phantom folder mechanism.

In some embodiments, the computer is not directly coupled to the scanning device. Instead, the scanning device is located remotely on a communication network of devices. This communication network of devices includes a shared file storage medium that is accessible from the computing device as well as the scanning device via the network. In these embodiments, the scanning device is still represented as a phantom folder but on a shared file storage medium (as opposed to a local folder on the user's computer). When this folder is opened, the software module informs the user to perform a scan operation on the remote scanner. The remote scanning device is capable of transferring the electronic documents to a predefined folder on the shared file storage medium. The software module on the user's computer then presents the contents of the predefined folder on the shared file storage medium to the user. The software module may process these documents per user specifications prior to displaying them to the user (including but not limited to image enhancements, optical character recognition and document format conversions). The user can then manipulate the electronic documents from within the phantom folder.

In some embodiments, multiple scanning devices connected through the communications network of devices can each be represented by a phantom folder. The user can choose any of the scanning devices on the network by selecting the appropriate phantom folder displayed on their computer.

In some embodiments, the user can scan using a scanning device on the communications network of devices first and then return to their computer to open the appropriate phantom folder representing the scanning device they used to scan. This represents cases where a set of scanning devices are shared among multiple users and the user chooses the first available device to scan.

In some embodiments, the user can open the phantom folder from within a target application (word processing application, electronic mail applications, browser application, etc.), initiate a scan as described in the previous embodiments from within the target application, and also open the electronic documents from within their target applications.

A thick client application denotes an application which operates on a predetermined platform or OS, such as Windows (registered trademark), Mac OS (registered trademark), iOS (registered trademark), and etc., in a PC and cannot be easily moved to another PC or another OS. For example, Adobe Acrobat Reader (registered trademark) recorded on an HD (Hard Disk) and similar applications correspond to thick client applications.

A thin client application denotes an application which does not depend on a predetermined platform or OS and is, for example, an application which can operate on a browser (such as Internet Explorer (registered trademark), Safari (registered trademark), or Firefox (registered trademark)). For example, Gmail (registered trademark), Yahoo!Mail (registered trademark), Box.net (registered trademark), Facebook (registered trademark), Evernote (registered trademark), and the like correspond to the thin client applications.

FIG. 1 is a schematic block diagram of a thick client system.

The thick client system includes a computing device 102, and a thick client application 104. Scanning is typically initiated by the thick client application 104 but can also be initiated on a scanner 100. However, a connection must exist to a thick client application 104. The thick client application 104 communicates with the scanner 100 through a scanner driver 103 specific to the scanner 100. The thick client application 104 contains special driver code 107 to make the application communicate with the scanner driver 103. The scanner 100 communicates with this scanner driver 103 through a host interface 101 and a predefined protocol.

The special driver code 107 typically corresponds to a standard API (such as ISIS, TWAIN, or WIA) supporting a scanner, and the scanner driver 103 is a driver for the standard API supporting a scanner.

When the thick client application 104 initiates scanning, scanned image data flows from the scanner 100, through the host interface 101, to the scanner driver 103 on the computing device 102 to the thick client application 104 through the special driver code (107). The thick client application 104 may then convert the scanned image data into a user specified format and save the data on a storage 105. The thick client application 104 may display the saved image data on a display 106.

Figure 2:
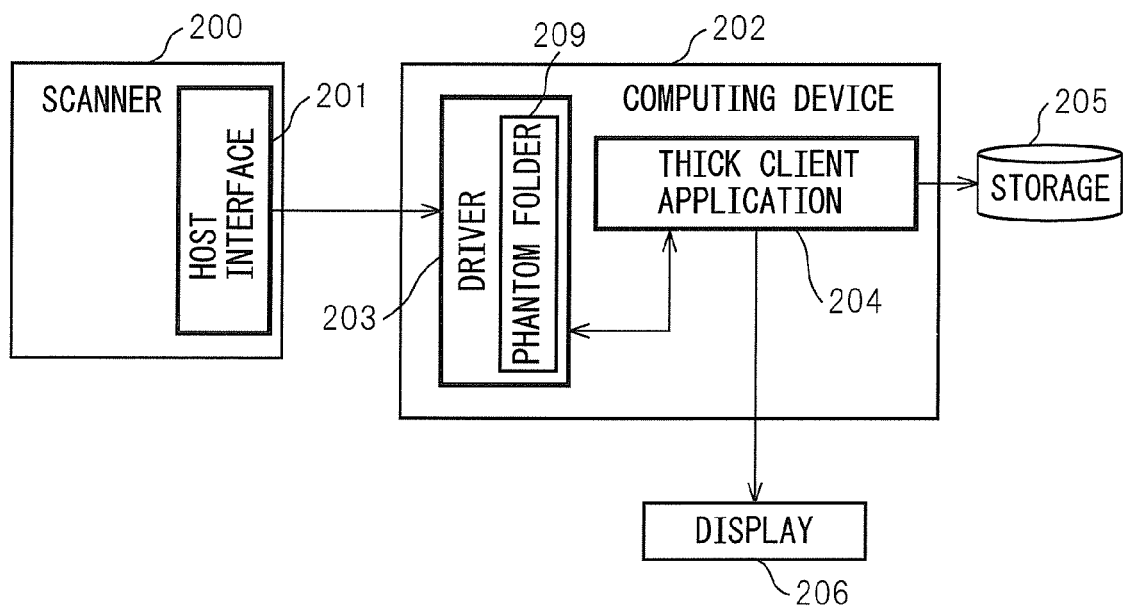
FIG. 2 is a schematic block diagram of a thick client system using a phantom folder.

FIG. 2 is a schematic block diagram of a thick client system using a phantom folder.

A scanner 200 scanning document to obtain scan data and capable of transmitting the obtained scan data to a computing device 202 includes a host interface 201 for transmitting/receiving data to/from the computing device 202.

The computing device 202 has a scanner driver 203 peculiar to a scanner for transmitting/receiving data and controlling driving of the scanner 200, a thick client application 204, and the like.

In FIG. 2, a phantom folder software module 209 is shown as a part of the scanner driver 203 for the scanner 200. (Although the preferred method is to have the phantom folder be part of a scanner driver, the present invention is not limited to such a method. The phantom folder software module 209 can be installed and exist independently of the scanner driver 203.) As a result of the phantom folder, an arbitrary thick client application 204 can serve as a scanning application. Therefore, the thick client application 204 does not have to contain any special driver code to communicate with the scanner 200. That is, the thick client application 204 is also not changed when the scanner or the scanner driver protocol is changed. The thick client application 204 initiates scanning and uses a scanned document by employing a standard file opening mechanism.

Since the phantom folder software module 209 is in conformance with a standard API supporting the scanner, in a manner similar to the system shown in FIG. 1, it can transfer image data read by the scanner 200 to the thick client application 204 via the scanner driver 203. Since the phantom folder software module 209 is in conformance with a standard API supporting the scanner, even when the scanner is changed, the phantom folder software module 209 can be linked to the changed scanner. Further, as will be described later, the phantom folder software module 209 can interact with the thick client application 204 by a standard file opening mechanism (such as the command "open"). Therefore, even when the thick client application is changed, the phantom folder software module 209 can be linked to the changed thick client application.

Figure 3:
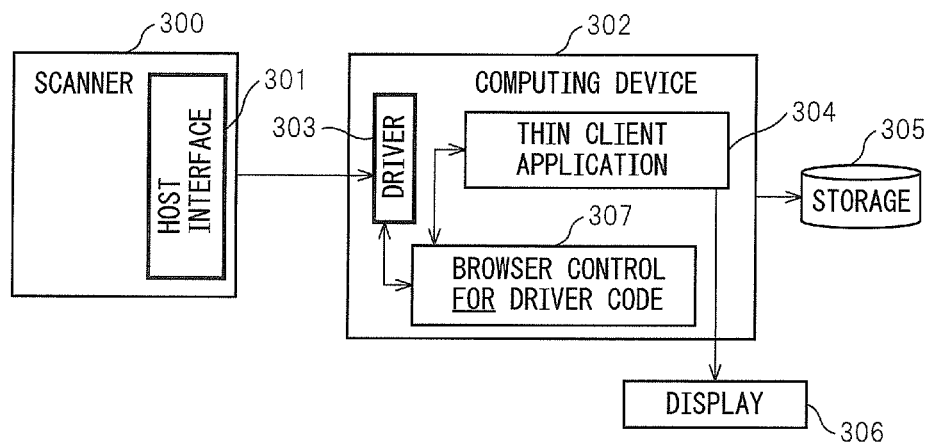
FIG. 3 is a schematic block diagram of a thin client system.

FIG. 3 is a schematic block diagram of a thin client system.

In the system shown in FIG. 3, a thin client application 304 is used, instead of the thick client application 104 shown in FIG. 1. Unlike with a thick client application, thin client applications are not capable of communicating with scanner drivers directly. Since thin client applications operate on a browser, the thin client system shown in FIG. 3 includes a special intermediate module called a browser control 307.

Figure 4:
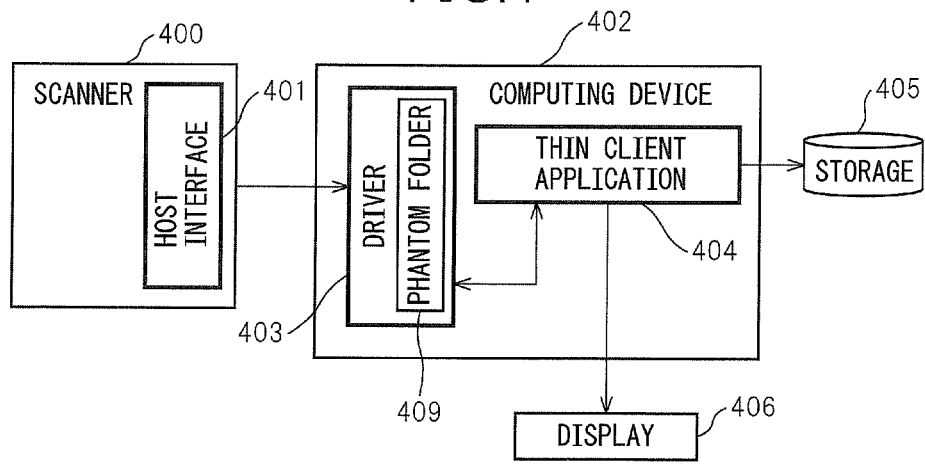
FIG. 4 is a schematic block diagram of a thin client system using a phantom folder.

FIG. 4 is a schematic block diagram of a thin client system using a phantom folder.

The thin client system shown in FIG. 4 includes a thin client application 404. In the system of FIG. 4, the browser control 307 shown in FIG. 3 is unnecessary. Rather, a phantom folder software module 409 is designed to function together with an arbitrary browser application and uses a browser as a scanning application. In the system of FIG. 4, the thin client application 404 initiates start of scanning and uses a scanned document by employing a standard file opening mechanism.

Since the phantom folder software module 409 conforms with a standard API supporting the scanner, in a manner similar to the system shown in FIG. 3, the module 409 can transfer image data read by a scanner 400 to the thin client application 404 via a scanner driver 403. Since the phantom folder software module 409 is in conformance with a standard API supporting the scanner, even when the scanner is changed, the phantom folder software module 409 can be linked to the changed scanner. Further, since the phantom folder software module 409 can interact with the thin client application 404 within a browser by a standard file opening mechanism (such as the command "attach"), even when the thin client application is changed, interaction is possible.

FIGS. 5 and 6 are schematic block diagrams of a thick client system using a network.

In the system shown in FIG. 5, a thick client application 507 communicates with a scanner driver 504 using special driver code 508 where the scanner driver 504 interacts with a scanner 500 using a network interface 503 on a computing device 502. The data interaction between the computing device 502 and the scanner 500 will depend on how the manufacturer of the scanner 500 and the developer of the thick client application 507 implement their modules.

The special driver code 508 corresponds to a standard API (such as ISIS, TWAIN, or WIA) supporting a scanner on a network, and the scanner driver 504 is a driver for the standard API supporting a scanner on a network. When the thick client application 507 provides an instruction to scan through a network, the image data scanned by the scanner 500 is delivered through the network interface 503 and the driver 504 to the thick client application 507.

The system shown in FIG. 6 illustrates another communication method. In the thick client systems shown in FIG. 6, a thick client application 607 communicates with a scanner 600 using special network code 609 which allows for direct communication with a network interface 603.

Figure 7:
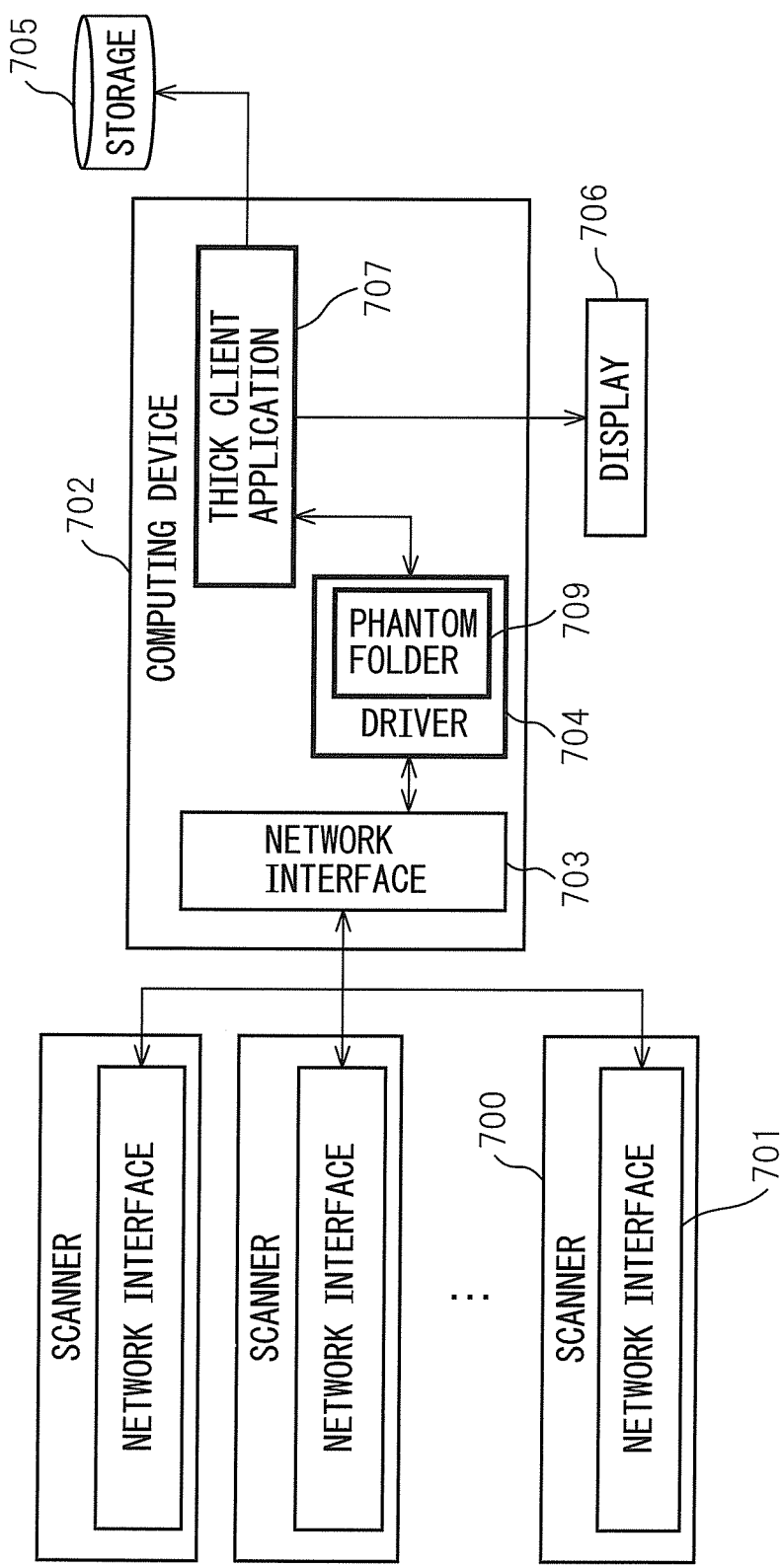
FIG. 7 is a schematic block diagram (1) of a thick client system on a network using a phantom folder.

FIGS. 7 and 8 are schematic block diagrams of a thick client system on a network using a phantom folder. The system shown in FIG. 7 corresponds to that of FIG. 5, and the system shown in FIG. 8 corresponds to that of FIG. 6.

In the thick client system illustrated in FIG. 7, the special driver code 508 necessary for communication with the scanner driver 504 illustrated in FIG. 5 is included in software of a phantom folder software module 709. Therefore, a thick client application 707 only needs use of a standard mechanism (file opening mechanism) to scan. As illustrated in FIG. 5, the thick client application 707 does not need the special driver code 508 for communication with a scanner 700.

Since the phantom folder software module 709 is in conformance with a standard API supporting a scanner on the network, the module 709 can transfer image data read by the scanner 700 to the thick client application 707 via a network interface 703 and a driver 704. Since the phantom folder software module 709 is in conformance with a standard API supporting a scanner on the network, even when the scanner is changed, the module 709 can be linked with the changed scanner. Further, as will be described later, the phantom folder software module 709 can interact with the thick client application 707 by a standard file opening mechanism (such as the command "open"). Therefore, even when the thick client application is changed, the phantom folder software module 709 can be linked with the changed thick client application.

As understood from FIG. 7, one or more "phantom folders" expressing the plurality of scanners 700 on the communication network can be used. Usually, the scanners 700 are displayed as different "phantom folders" (with respect to the "phantom folder" displayed on the display, see FIGS. 14 to 19). However, the user can select to display only one "phantom folder" on his/her computer. In this case, the "phantom folder" is associated with the scanner 700 as an option of the user, and the association can be changed to another scanner 700 at an arbitrary time. This is very much like choosing a default printer among a set of network printers and changing that default printer at a later time.

In the thick client system illustrated in FIG. 8, the special driver code 609 necessary for communication with the network interface 603 illustrated in FIG. 6 is included in software of a phantom folder software module 809. Therefore, a thick client application 807 only needs use of a standard mechanism (file opening mechanism) to scan. As illustrated in FIG. 6, the thick client application 807 does not need the special network code 609 for communication with a scanner 800.

Since the phantom folder software module 809 conforms with a standard API supporting a scanner on the network, the module 809 can transfer image data read by the scanner 800 to the thick client application 807 via a network interface 803. Since the phantom folder software module 809 is in conformance with a standard API supporting a scanner on the network, even when the scanner is changed, the module 809 can be linked to the changed scanner. Further, as will be described later, the phantom folder software module 809 can interact with the thick client application 807 by a standard file opening mechanism (such as the command "open"). Therefore, even when the thick client application is changed, the phantom folder software module 809 can be linked to the changed thick client application.

FIGS. 9 and 10 are schematic block diagrams of a thin client system using a network.

In the system shown in FIG. 9, similar to the system shown in FIG. 3, a browser control 908 is required to implement the interfaces to a scanner driver 904 on the user's computing device 902. Specifically, special driver code 909 is required within a browser control 908 to use a scanner 900. If the scanner 900 changes or a modified version of the scanner software is released, a thin client application 907 or the browser control 908 may have to be modified.

In the system shown in FIG. 10, similarly to the system shown in FIG. 3, a browser control 1008 is required to implement the interfaces to a network interface 1003 on the user's computing device 1002. Specifically, special network code 1009 is required within a browser control 1008 to use a scanner 1000. If the scanner 1000 changes or a modified version of the scanner software is released, a thin client application 1007 or the browser control 1008 may have to be modified.

Figure 12:
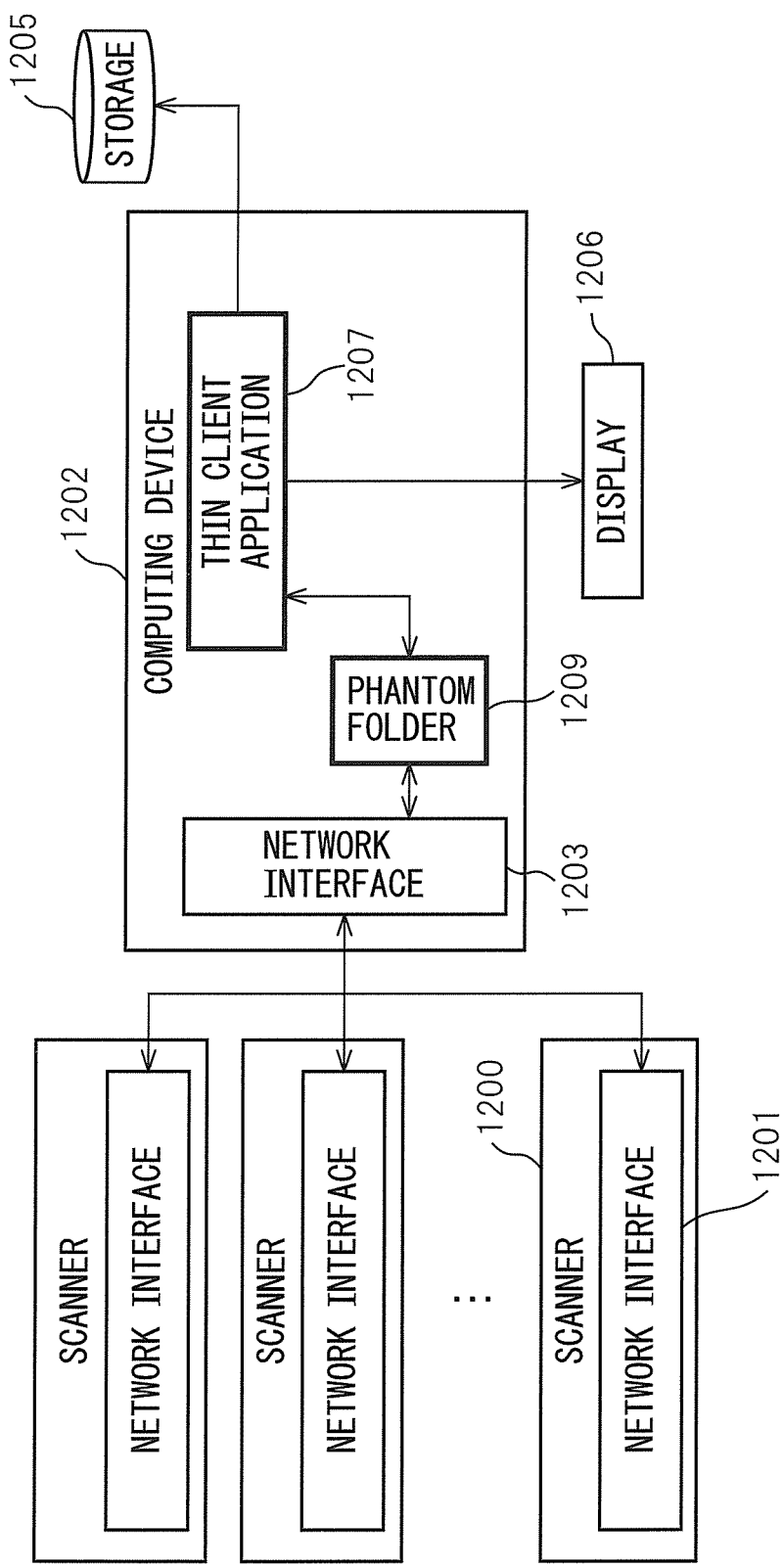
FIG. 12 is a schematic block diagram (2) of a thin client system on a network using phantom folders.

FIGS. 11 and 12 are schematic block diagrams of a thin client system on a network using phantom folders. The system shown in FIG. 11 corresponds to that of FIG. 9, and the system shown in FIG. 12 corresponds to that of FIG. 10.

As illustrated in FIG. 11, a special code necessary for communication with a scanner driver 1104 is included in software of a phantom folder software module 1109. Therefore, a thin client application 1107 only needs use of a standard mechanism (file opening mechanism) to scan and does not need the browser control 307 as shown in FIG. 3.

Since the phantom folder software module 1109 conforms with a standard API supporting a scanner on the network, the module 1109 can transfer image data read by a scanner 1100 to the thin client application 1107 via a network interface 1103 and the scanner driver 1104. Since the phantom folder software module 1109 conforms with a standard API supporting a scanner on the network, even when the scanner is changed, the module 1109 can be linked with the changed scanner. Further, since the phantom folder software module 1109 can interact with the thin client application 1107 as a browser by a standard file opening mechanism (such as the command "open"), even when the thin client application is changed, the phantom folder software module 1109 can be linked to the changed thin client application.

As understood from FIG. 11, one or more "phantom folders" expressing the plurality of scanners 1100 on the communication network can be used. Usually, the scanners 1100 are displayed as different "phantom folders". However, the user can select to display only one "phantom folder" on his/her computer. In this case, the phantom folder is associated with the scanner 1100 as a user option, and the association can be changed to another scanner 1100 at an arbitrary time.

As illustrated in FIG. 12, a special code necessary for communication with a network interface 1203 is included in software of a phantom folder software module 1209. Therefore, a thin client application 1207 needs only use of a standard mechanism (file opening mechanism) to scan and does not need the browser control 307 as shown in FIG. 3.

Since the phantom folder software module 1209 is in conformance with a standard API supporting a scanner on the network, the module 1209 can transfer image data read by a scanner 1200 to the thin client application 1207 via the network interface 1203. Since the phantom folder software module 1209 conforms with a standard API supporting a scanner on the network, even when the scanner is changed, the module 1209 can be linked to the changed scanner. Further, since the phantom folder software module 1209 can interact with the thin client application 1207 by a standard file opening mechanism (such as the command "open"), even when the thin client application is changed, the phantom folder software module 1209 can be linked to the changed thin client application.

As understood from FIG. 12, one or more "phantom folders" expressing the plurality of scanners 1200 on the communication network can be used. Usually, the scanners 1200 are displayed as different "phantom folders". However, the user can select to display only one "phantom folder" on his/her computer. In this case, the phantom folder is associated with the scanner 1200 as a user option, and the association can be changed to another scanner 1200 arbitrarily.

Figure 13:
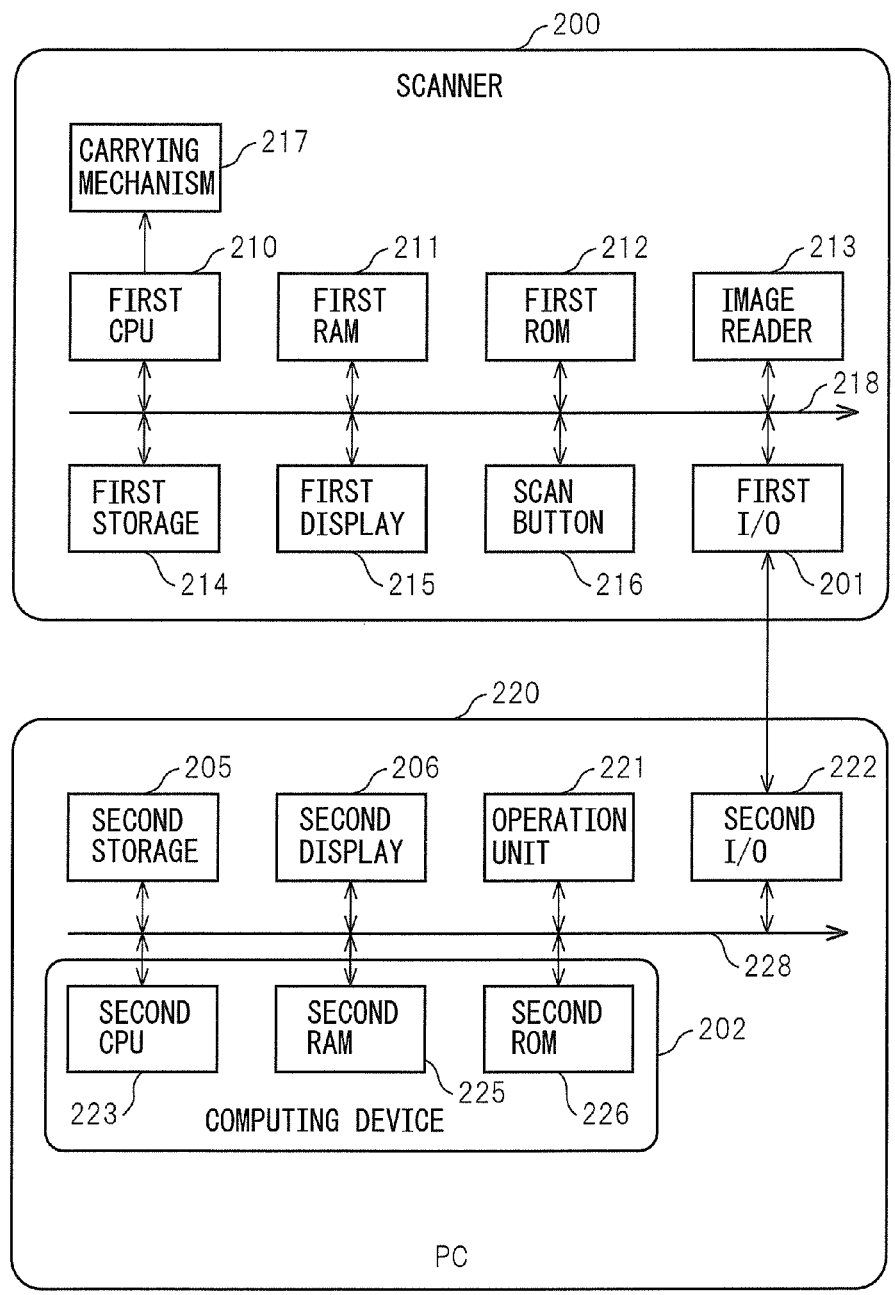
FIG. 13 is a diagram showing an example of a hardware configuration of a system.

FIG. 13 is a diagram showing an example of a hardware configuration of a system. The configuration shown in FIG. 13 is merely an example of the system, and therefore the scanning device, the scanning method and the computer-readable medium using the phantom folder can be apply any computing device, display, and communication mechanism with the scanner. For instance, a user can use an Apple device with a wireless interface to a scanner but still use the phantom folder mechanism. Further, a user in an office carrying an iPad (registered trademark) can go to one of the shared scanners in the office, and then see a phantom folder for the scanner on the iPad (registered trademark), and hence use it to scan some documents.

FIG. 13 shows an example of constructing the thick client system illustrated in FIG. 2 by a system in which the scanner 200 and a PC 220 capable of operating under the Windows (registered trademark) environment are connected to each other. The scanner 200 has a configuration in which a first CPU 210, a first RAM 211, a first ROM 212, an image reader 213 having image reading elements such as CCD, a first storage 214, a first display unit 215 including a liquid crystal display, a scan button 216 provided on the scanner 200 for starting scanning, a first I/O 201, and the like are connected to a bus 218. In the scanner 200, while carrying a document by a carrying mechanism 217 driven by a control signal from the first CPU 210, image data is generated from the document by the image reader 213. After that, the image data is buffered in the first storage 214 and transferred to the PC 220 side by using the first I/O 201.

The PC 220 has a configuration in which the computing device 202 including a second CPU 223, a second RAM 225, and a second ROM 226, a (second) storage 205 having a recording medium such as an HD, a (second) display unit 206 including a liquid crystal display, an operation unit 221 including a keyboard and a mouse, a second I/O 222, and the like are connected to a bus 228. The thick client application 204, the scanner driver 203, and the phantom folder software module 209 are stored in the (second) storage 205 and executed by the computing device 202. That is, the PC 220 including the computing device 202, the storage 205, and the display unit 206 functions as a scanning device executing scanning.

The hardware configuration of the thick client system shown in FIG. 2 has been described with reference to FIG. 13. Any of the systems shown in FIGS. 4, 7, 8, 11, and 12 can be realized by a similar hardware configuration.

FIGS. 14 to 18 are pictures showing display screen examples in the case of using a phantom folder.

How "phantom folder" is used and displayed in the thick client system shown in FIG. 2 will be described using the example in FIGS. 14 to 18. It is assumed that, in the thick client system shown in FIG. 2, the scanner 200 and the PC 220 which can operate under the Windows (registered trademark) environment are connected to each other as shown in FIG. 13 and the scanner 200 is in a usable state. The pictures shown in FIGS. 14 to 18 are examples and the invention is not limited to them. Also in the systems shown in FIGS. 4, 7, 8, 11, and 12, the "phantom folder" can be displayed and used employing similar display displays.

Figure 14:
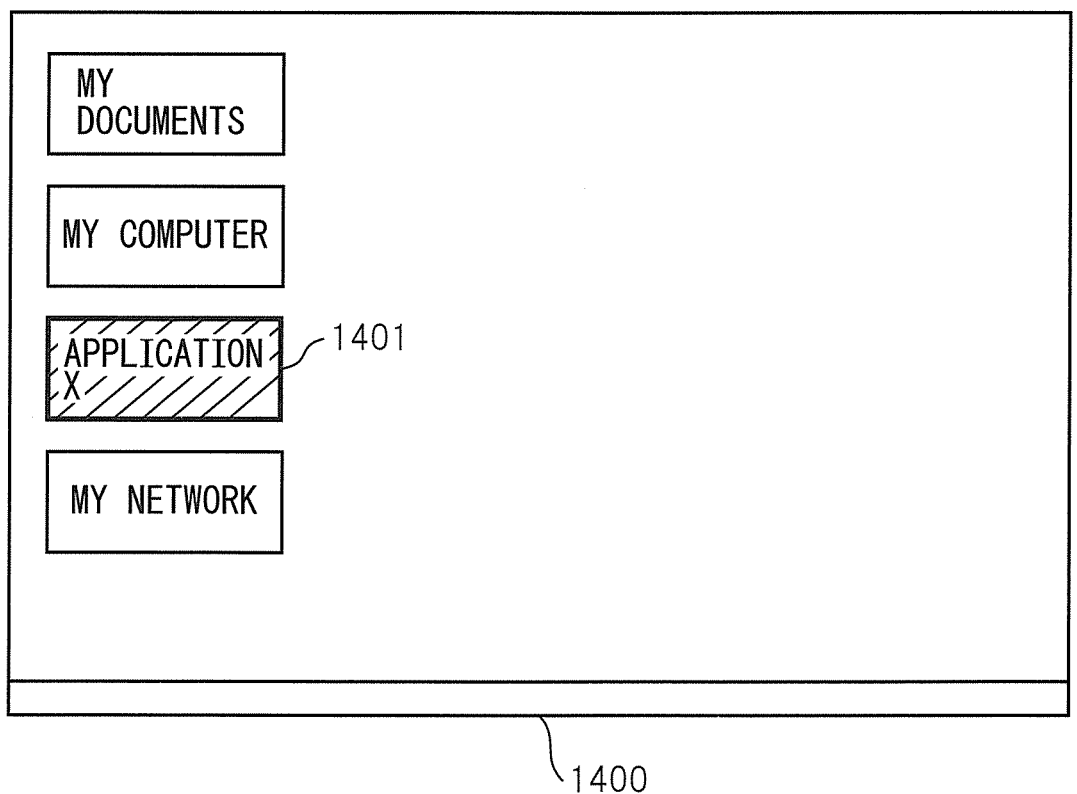
FIG. 14 is a picture showing a display screen example (1) in the case of using a phantom folder.

FIG. 14 shows an example of a display 1400 of a PC displayed on the (second) display unit 206 of the PC 220. Four icons are displayed on the display 1400 and FIG. 14 shows a state where an icon 1401 corresponding to an application X is selected. The application X is, for example, Adobe Acrobat Reader (registered trademark) or a similar application on the PC 220 running Windows (registered trademark).

Figure 15:
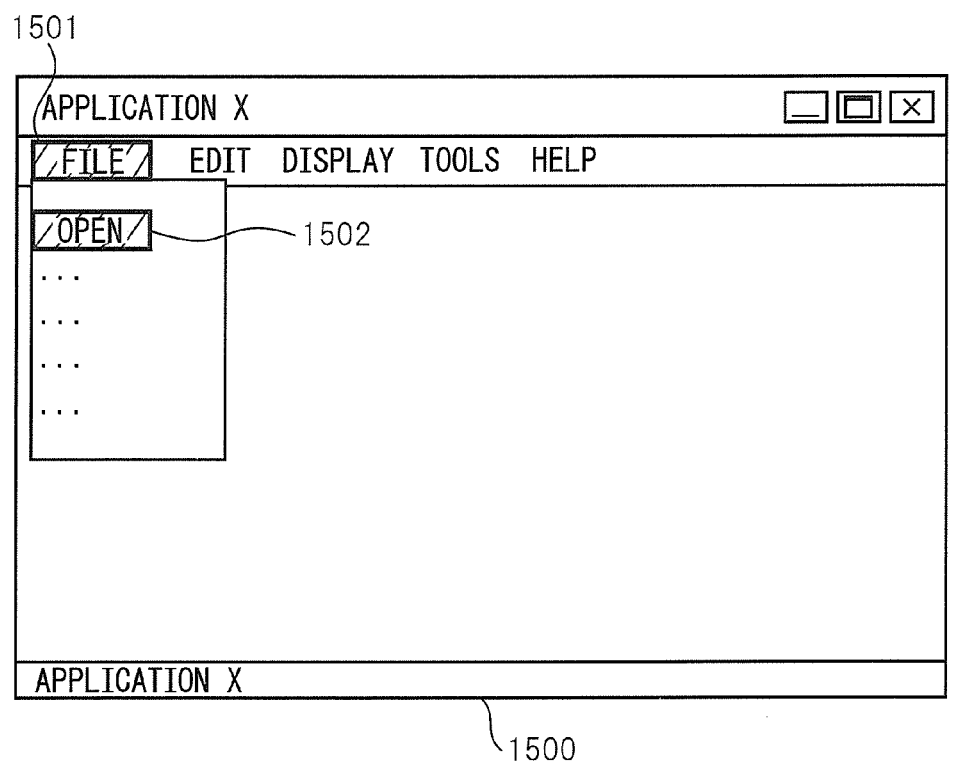
FIG. 15 is a picture showing a display screen example (2) in the case of using a phantom folder.

FIG. 15 shows an example of a display 1500 in which the selected application X starts. The diagram shows a state where a "file menu" 1501 is selected first and an "open" command 1502 in commands displayed after that is selected.

Figure 16:
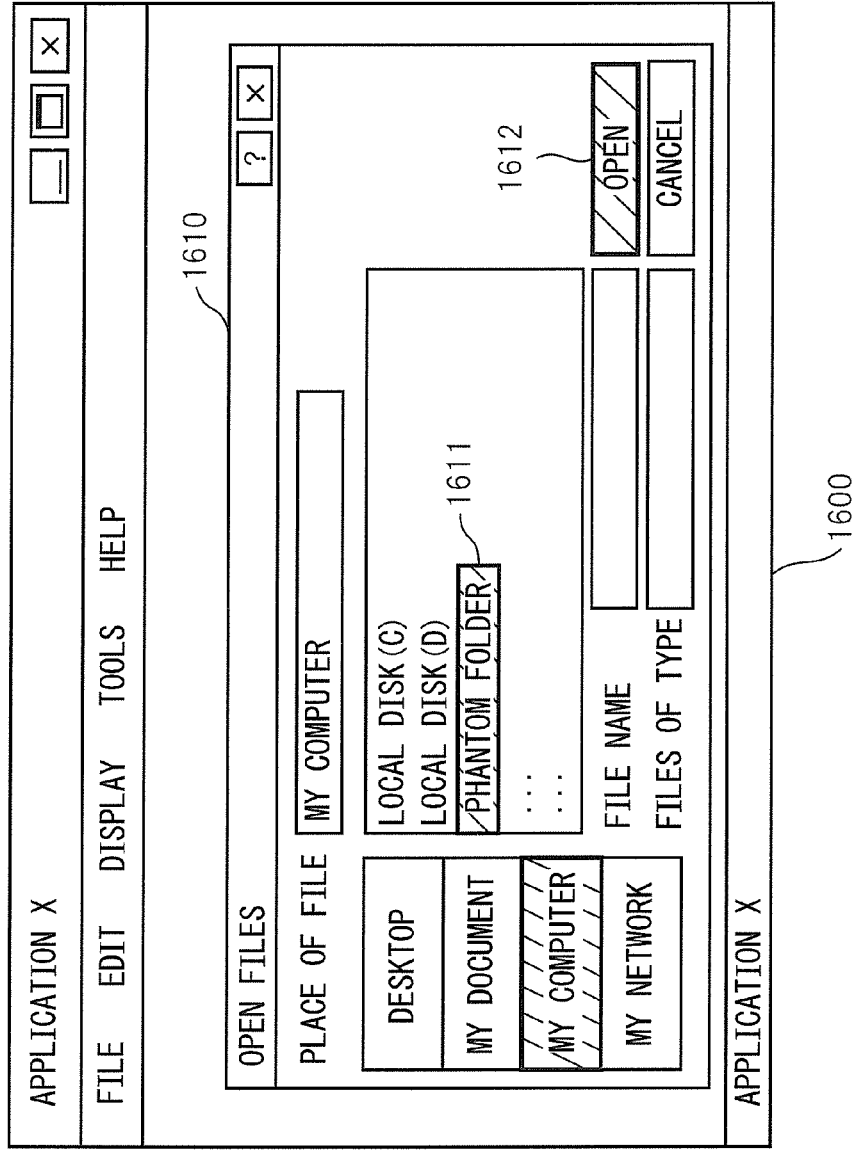
FIG. 16 is a picture showing a display screen example (3) in the case of using a phantom folder.

FIG. 16 shows a display 1600 in which a small display 1610 for "open file" is displayed in response to selection of the "open" command 1502 in FIG. 15. In the small display 1610, the scanner 200 is displayed as a "phantom folder" 1611 in "my computer". The diagram shows a state where the "phantom folder" 1611 is selected and, further, an "open" command 1612 is selected.

Figure 17:
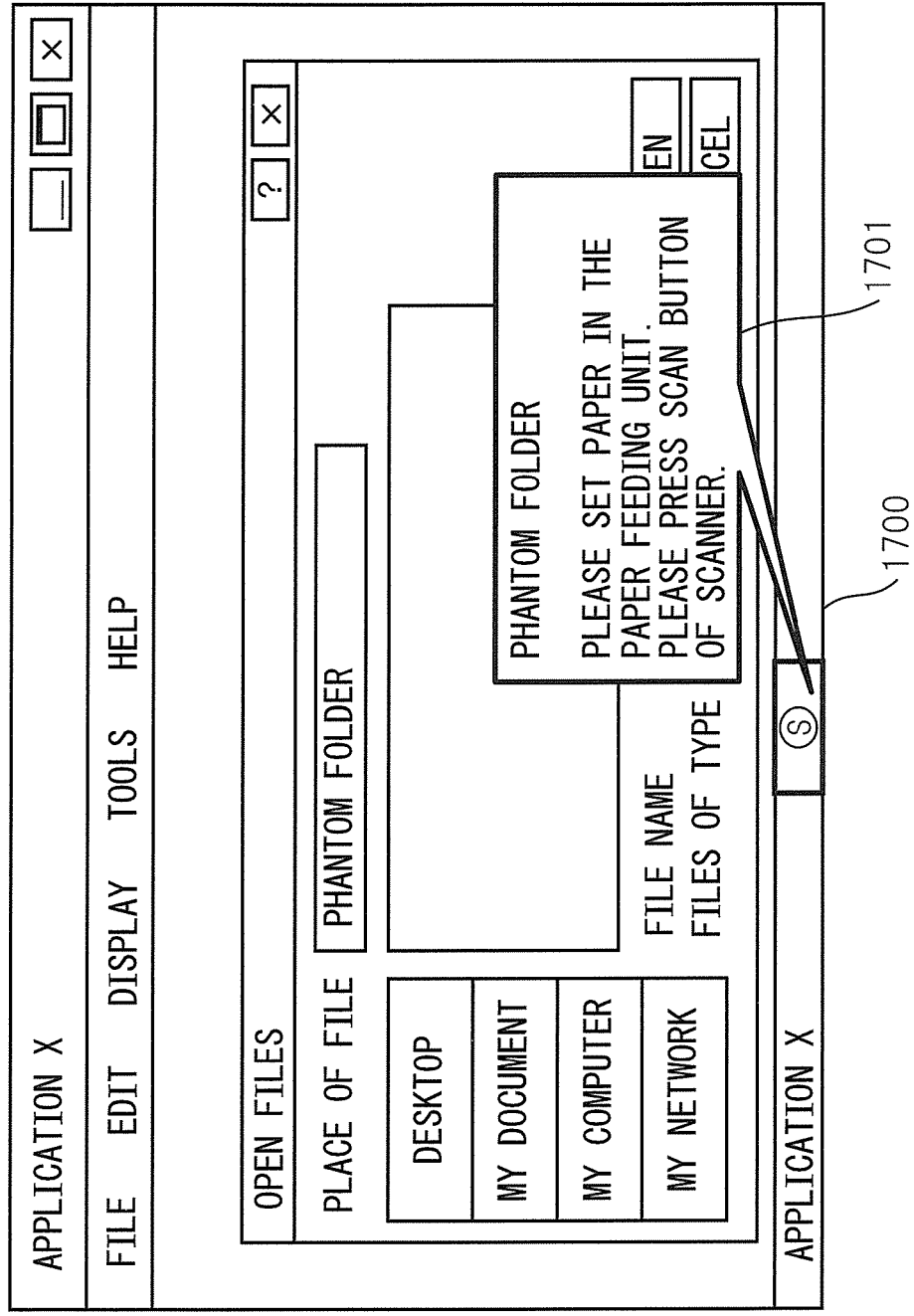
FIG. 17 is a picture showing a display screen example (4) in the case of using a phantom folder.

FIG. 17 shows a state where, in response to the selection of the "open" command 1612 in FIG. 16, a popup message 1701 "Please set paper in paper feeding unit. Please press scan button of scanner" is displayed in a file list part in the application X.

When the user sets a document in the paper feeding unit (not shown) in the scanner 200 and presses the scan button 216 disposed in the scanner 200 in response to the popup message 1701, scanning of the document starts. Image data generated by the scanning is transmitted to the PC 220 and stored as document data in a predefined place (for example, the storage 205).

Figure 18:
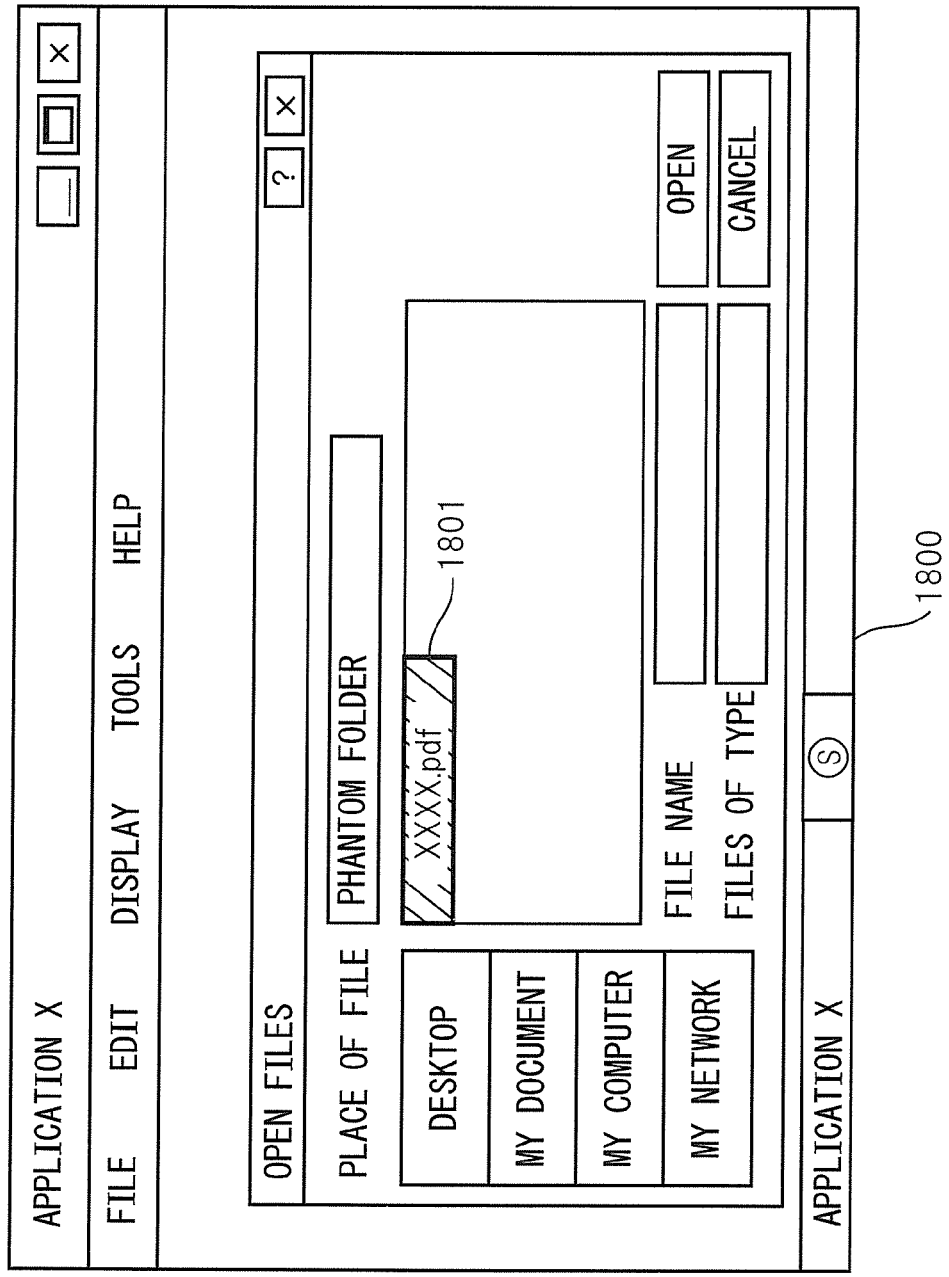
FIG. 18 is a picture showing a display screen example (5) in the case of using a phantom folder.

FIG. 18 shows a state where the image data generated by the scanning is displayed as a document 1801 in the "phantom folder".

Subsequently, the user can scan another document or process (such as open, copy, and transfer) the scanned document. In FIG. 18, a PDF file is shown as an example of a document format. Image data can be also scanned as a JPEG image, a TIF file, or other formats and displayed in the "phantom folder". The phantom folder software module 209 can also execute an optical character recognition process and convert a scanned document into a format such as Microsoft Word (registered trademark) which can be edited by the user.

An advantage of this approach is that the phantom folder is visible from any file open dialog, which also means that any software application can be used as a scanning application, as long as the application can open documents.

In some embodiments, multiple scanning devices including scanners on the network are represented on the user's computer as "phantom folders" thereby providing the user a choice of scanning devices to choose from. The presentation of the multiple scanning devices may be similar to how network printers are presented to the user on their computer. The user has the option of selecting those scanning devices to display on a computer as "phantom folders".

In some embodiments, the user can scan multiple times/documents into the "phantom folder" resulting in multiple electronic documents. The user can then manipulate these documents, much like any other set of electronic documents.

In some embodiments, a user can be within a target application and open the phantom folder in a special 'merge' mode wherein the user can merge a newly scanned document with the document that is currently being viewed in the target application.

Figure 19:
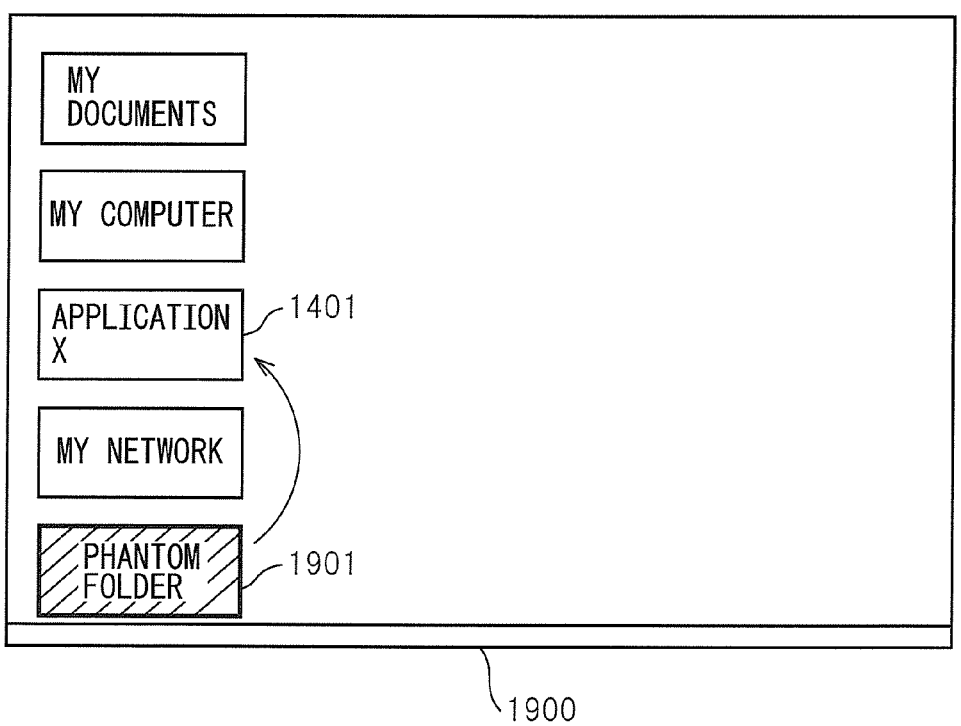
FIG. 19 is a showing another display screen example in the case of using a phantom folder.

FIG. 19 shows an example of another display 1900 of the desktop displayed in the display unit 206. On the display 1900, in addition to the four icons shown in FIG. 14, a "phantom folder" icon 1901 is displayed. In the example of FIGS. 14 to 18, after the application X is started, the "open" command is used and, when the scanner 200 is usable, "phantom folder" is displayed in "my computer". However, when the scanner 200 is usable from the beginning as shown in FIG. 19, the "phantom folder" icon 1901 can be automatically displayed. For example, by dragging the "phantom folder" icon 1901 and dropping it in an "application X" icon 1401, a scanning operation may be initiated and scanned documents may be automatically opened within Application X. This avoids the additional inconvenience of going through multiple steps to perform the scanning operation.

Figure 20:
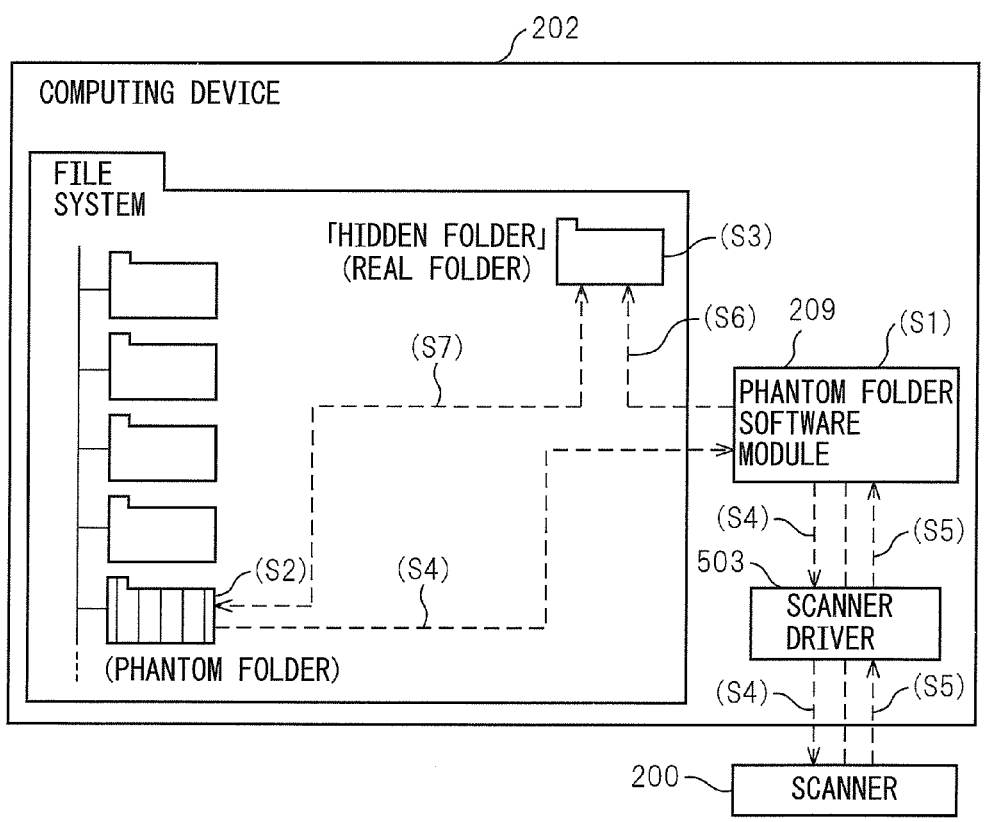
FIG. 20 is a diagram showing an example of the internal architecture of the phantom folder mechanism.

FIG. 20 is a diagram showing an example of the internal architecture of the phantom folder mechanism.

The internal architecture of the phantom folder mechanism will be described in association with the system in the thick client shown in FIG. 2. It can be also similarly associated with any of the systems shown in FIGS. 4, 7, 8, 11, and 12. The following processes performed by the phantom folder software module 209 are executed, in practice, by the second CPU 223 (refer to FIG. 13) included in the computing device 202 on the basis of the phantom folder software module.

First, the phantom folder software module 209 is installed in the computing device 202 (S1). Typically, the phantom folder software module 209 is installed together with the scanner driver 203 of the scanner 200.

Next, the phantom folder software module 209 displays the "phantom folder" as an object on the display of the display unit 206 (refer to the "phantom folder" 1611 in FIG. 16) (S2). The phantom folder software module 209 obtains data from a scanner monitoring program at predetermined intervals to recognize a usable scanner 200 connected to the PC 220 (or a usable scanner connected to the network). Further, in the case where a usable scanner exists, the phantom folder software module 209 displays "phantom folder" as a phantom self of the usable scanner at a predetermined position (refer to FIG. 16 or 19). That is, the user is informed that when the "phantom folder" is displayed, the scanner 200 corresponding to the "phantom folder" can be used.

Next, the phantom folder software module 209 generates a "hidden folder" (actual folder) which is not actually displayed on the display unit 206, and associates the contents of the "hidden folder" with the "phantom folder."

Next, when the user clicks the "phantom folder" on the display (with an additional optional requirement that the user pushes the scan button 216 of the scanner 200), the phantom folder software module 209 causes the scanner 200 to start scanning through the scan driver 203 (S4).

Next, the phantom folder software module 209 processes the scanned document data through the scan driver 203 (S5). The phantom folder software module 209 stores the processed document data in the "hidden folder" (S6). When a document is added to the "hidden folder," the same document is displayed in the "phantom folder."

FIG. 21 is a diagram showing an example of the process flow in the case of using the thick client application and the phantom folder. In the flow, the case of using the system in the thick client shown in FIG. 2 will be described as an example. The case can be similarly applied to the systems shown in FIGS. 7 and 8. The first CPU 210 executes the process flow indicated in FIG. 21 by a computer program which is stored in the first storage 214. The computer program is installed on the first storage 214 from a computer-readable, non-transitory medium such as a compact disk read only memory (CD-ROM), a digital versatile disk read only memory (DVD-ROM), or the like by using a well-known setup program or the like.

First, the user opens the thick client application 204 such as Adobe Acrobat Reader (registered trademark) or a similar application on the PC 220 running Windows (registered trademark) (S10).

Next, the user selects the "file" menu on the display of the display unit 206, selects the "open" dialog or menu (S11), and selects "phantom folder" of a desired scanner (refer to "phantom folder" 1611 in FIG. 16) (S12).

Subsequently, the user activates the scanner 200 to start scanning (S13). After completion of the scanning, a document file in the PDF format (or document in JPEG or similar format) is displayed in, for example, a "file" or "open" dialog (S14).

When the user selects the PDF file (S15), the content of the selected PDF file (the same content as that of the document which is set in the paper feeding unit in the scanner 200 by the user) is displayed in the display of the display unit 206 (refer to the document data 1801 in FIG. 18) (S16). In this case, the thick client application 204 does not need any scanning software for the operation.

FIG. 22 is a diagram showing an example of the process flow of the case of using the thin client application and the phantom folder. The flow will be described with the case of using the system in the thin client shown in FIG. 4, as an example. The flow can be similarly applied to the systems shown in FIGS. 11 and 12.

First, the user opens the thin client application 404 such as Gmail (registered trademark), Yahoo!Mail (registered trademark), Box.net (registered trademark) or a similar application (S20).

Next, the user selects the "file" or "open" or "attach" dialog on the display of the display unit 406 (S21), and selects "phantom folder" of a desired scanner (S22). The phantom folder software module 409 obtains data from a scanner monitoring program at predetermined intervals to recognize a usable scanner connected to the PC (or a usable scanner connected to the network). Further, in the case where a usable scanner exists, the phantom folder software module 409 displays "phantom folder" as a phantom self of the usable scanner (refer to FIG. 16 or 19). That is, the user is informed about the fact when "phantom folder" is displayed, the scanner corresponding to the "phantom folder" can be used.

Subsequently, the user activates the scanner 400 to start scanning (S23). After completion of the scanning, a document file in the PDF format (or document in JPEG or similar format) is displayed in, for example, a "file" or "open" dialog (S24).

When the user selects the PDF file (S25), the content of the selected PDF file can be displayed, attached to an electronic mail, or uploaded to a computer/server (S26). In this case, a special scanning code is unnecessary for the thin client application 404.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention.

What is claimed is:

1. A scanning device comprising:
   a controller configured to display, on a display unit, a phantom folder corresponding to a scanner, only when the scanner is ready for scanning operations, and to start a scanning operation by the scanner when the phantom folder is selected;
   a receiver for receiving scan data from the scanner; and
   a storage for storing the scan data received.

2. The scanning device according to claim 1, wherein the controller displays the phantom folder on the display unit by using an open command of an application.

3. The scanning device according to claim 1, wherein the controller starts scanning operation by a scanner by transmitting a scan start signal conforming to a standard API which supports scanners, to the scanner.

4. The scanning device according to claim 1, wherein the controller converts the scan data into a document type which is set by the user and stores the resultant data in the storage.

5. The scanning device according to claim 1, wherein the controller displays the scan data in the phantom folder.

6. A scanning method comprising:
   displaying, on a display unit, a phantom folder corresponding to a scanner, only when the scanner is ready for scanning operations;
   starting a scanning operation by the scanner when the phantom folder is selected;
   receiving scan data from the scanner; and
   storing the scan data received into a storage.

7. The scanning method of claim 6, further comprising displaying, on the display unit, a second phantom folder corresponding to a second scanner; and starting a scanning operation by the second scanner when the second phantom folder is selected.

8. A computer readable non-transitory medium storing a computer program, the computer program when executed by a computer causing the computer to execute a process, the process comprising:
   displaying, on a display unit, a phantom folder corresponding to a scanner, only when the scanner is ready for scanning operations;
   starting a scanning operation by the scanner when the phantom folder is selected;
   receiving scan data from the scanner; and
   storing the scan data received into a storage.

* * * * *